United States Patent [19]

Hashimoto et al.

[11] Patent Number: 4,574,903

[45] Date of Patent: Mar. 11, 1986

[54] MOTOR DRIVEN POWER STEERING SYSTEM

[75] Inventors: Akio Hashimoto, Kawasaki; Tomio Yasuda, Kasukabe, both of Japan

[73] Assignee: Aisin Seiki Kabushiki Kaisha, Kawasaki City, Japan

[21] Appl. No.: 556,669

[22] Filed: Nov. 30, 1983

[30] Foreign Application Priority Data

Nov. 30, 1982 [JP] Japan ................. 57-209697

[51] Int. Cl.⁴ .............................................. B62D 5/04
[52] U.S. Cl. .................................................. 180/79.1
[58] Field of Search ....................... 180/79.1, 141, 143, 180/132, 163

[56] References Cited

U.S. PATENT DOCUMENTS

| | | | |
|---|---|---|---|
| 2,698,006 | 12/1954 | Wichmann et al. | 180/163 |
| 2,754,465 | 7/1956 | Brier | 180/79.1 X |
| 3,191,109 | 6/1965 | Hepner | 180/79.1 X |
| 3,924,705 | 12/1975 | Sugisawa | 180/143 |
| 4,083,422 | 4/1978 | Blakeslee et al. | 180/79.1 X |

FOREIGN PATENT DOCUMENTS

| | | |
|---|---|---|
| 0051515 | 5/1982 | European Pat. Off. . |
| 55-76760 | 6/1980 | Japan ................. 180/79.1 |
| 618754 | 2/1949 | United Kingdom . |
| 1395954 | 5/1975 | United Kingdom . |
| 1491711 | 11/1977 | United Kingdom . |
| 2079691 | 1/1982 | United Kingdom . |
| 2086323 | 5/1982 | United Kingdom . |

Primary Examiner—John A. Pekar
Attorney, Agent, or Firm—Sughrue, Mion, Zinn, Macpeak and Seas

[57] ABSTRACT

A power steering system uses an electric motor to produce an auxiliary torque which is added to the torque applied to the steering wheel of a vehicle by the driver. The torque applied by the driver is detected by sensors. The system includes a control apparatus to control the operation of the motor according to the output signal from the sensors. The system further includes a closed electrical loop for feeding a signal corresponding to the output from the motor back to the input side of the loop. A variable-resistor is placed so that the amplification factor of an amplifier included in the loop can be changed by the resistor. The knob attached to the variable-resistor is disposed on the dashboard of the vehicle such that it can be reached by the driver's hand. This permits the driver to change the servo ratio, i.e., the ratio of the output torque of the power steering system to the input torque applied by the driver, while the vehicle is in motion.

7 Claims, 12 Drawing Figures

MOTOR DRIVEN POWER STEERING SYSTEM

FIELD OF THE INVENTION

The present invention relates to a motor driven power steering system for amplifying the torque applied by the driver of a vehicle.

BACKGROUND OF THE INVENTION

A large force is needed to rotate the steering wheel of a vehicle for changing the direction of the tires when the vehicle is at rest or moving at a lower velocity. Particularly, front-engine front-drive automobiles which have recently gained popularity increasingly require greater force to turn the steering wheel, because large weight bears on the front portion of this kind of vehicle.

It is known that a power steering system amplifies the torque applied to the steering wheel by the driver. This system generates a driving force according to the torque applied by the driver and then transmits the force to the steering system. Most of the power steering systems now put into practical use are hydraulic in structure. Specifically, such a power steering system is equipped with a control valve, a hydraulic cylinder, etc. and produces an auxiliary torque by moving oil according to the torque applied by the driver.

Unfortunately, the control valve, hydraulic cylinder, and other components occupy large space. Further, pipes and similar components for connecting those components cannot be bent with a curvature smaller than a given value in order to prevent an occurrence of a large pressure loss. In addition, hydraulic structure must have certain and reliable sealings to prevent leakage of oil and is difficult to treat when mounted in the associated mechanism. Hence, it is difficult to install a power steering system in a vehicle having a small free space like a front-engine front-drive automobile.

Recently, the number of female drivers is on the increase. Although it is desired for female drivers that a vehicle can be steered with a small torque, such a vehicle does not give a good steering feeling to men of great physical strength. Also, when the vehicle is running at a higher velocity, the driver will be given a too light steering feeling. If the driver is not accustomed to the vehicle, he or she might turn the handle more than needed. It is also desired for men drivers of muscle that the vehicle can be steered with a small torque when they are tired, for example.

Some of conventional power steering systems can change the servo ratio, i.e., the ratio of the output torque of the power steering system to the input torque applied by the driver, In response to the velocity of the vehicle. However, even in this kind of vehicles the servo ratio is held constant for the same velocity. Therefore, if the characteristic of the ratio is set for women, then the system may be inconvenient for men, and vice versa.

SUMMARY OF THE INVENTION

Accordingly, it is an object of the present invention to provide motor driven power steering system which gives a steering feeling as may be desired by each individual driver.

It is another object of the invention to provide a power steering system which can change its characteristics with a simple operation.

These objects are achieved in accordance with the invention by providing a power steering system which comprises an electric motor such as a DC motor serving as a source of driving force, a steering torque detector for causing the motor to produce a torque according to the torque applied by the driver to amplify the torque, and a servo ratio setting means disposed at a position that can be reached by the driver's hand while the vehicle is running to establish the relation between the output level of the detector and the output torque of the motor. This system is capable of setting the best servo ratio according to each individual driver's wish, whether the driver is a man or woman. Further, since the servo ratio setting means is disposed at a position that can be reached by the driver's hand while the vehicle is in motion, the servo ratio can be altered during running of the vehicle. Therefore, the driver can establish a desired servo ratio while the vehicle is in motion without the need to add a function for controlling the servo ratio according to the velocity of the vehicle. Thus, it is easy for the driver to produce a given auxiliary torque by increasing the servo ratio only when the velocity of the vehicle is close to zero and to reduce the servo ratio when the velocity exceeds a predetermined value. This is attained without requiring particularly cumbersome operations and without impairing the intrinsic function of the power steering system. Hydraulically controlled power steering systems are required to be rather complicated in structure to change the servo ratio, but the electrically controlled power steering system can alter the servo ratio in spite of its simple structure.

Preferably, power steering systems constitute a control system which operates reliably and which has a good response. Accordingly, in one preferred aspect of the invention, the output signal such as a motor load current is fed back to the preceding stage to perform a closed loop control. An amplifier or attenuator is placed betweeen the input terminal to which the torque signal is applied and a steering torque detector in this control system to change the relation between the steering input torque and the output torque of the motor, i.e. the servo ratio, by varying its amplification factor or attenuation amount. Other objects and features of the invention will appear in the course of the description of the invention which is taken in conjunction with the accompanying drawings.

DETAILED DESCRIPTION OF THE INVENTION

Figure 1:
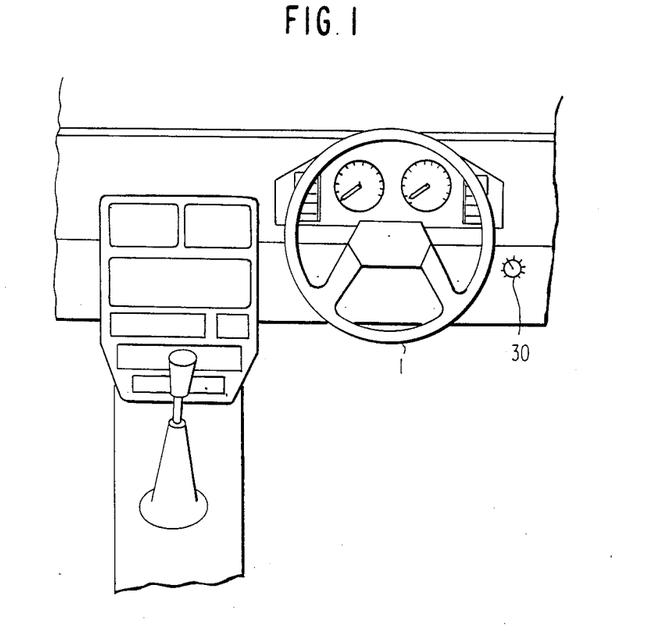
FIG. 1 is a view schematically showing the front side of the driver's seat of an automobile equipped with a power steering system according to the present invention.

Referring first to FIG. 1, there is shown the vicinity of the driver's seat of a vehicle equipped with a motor driven power steering system embodying the concept of the invention. The power steering system includes a servo ratio setting knob 30 disposed on the dashboard and near the steering wheel. The knob 30 is securely fixed to the rotating shaft of variable resistors VR1 and VR3 (described later).

Figure 2:
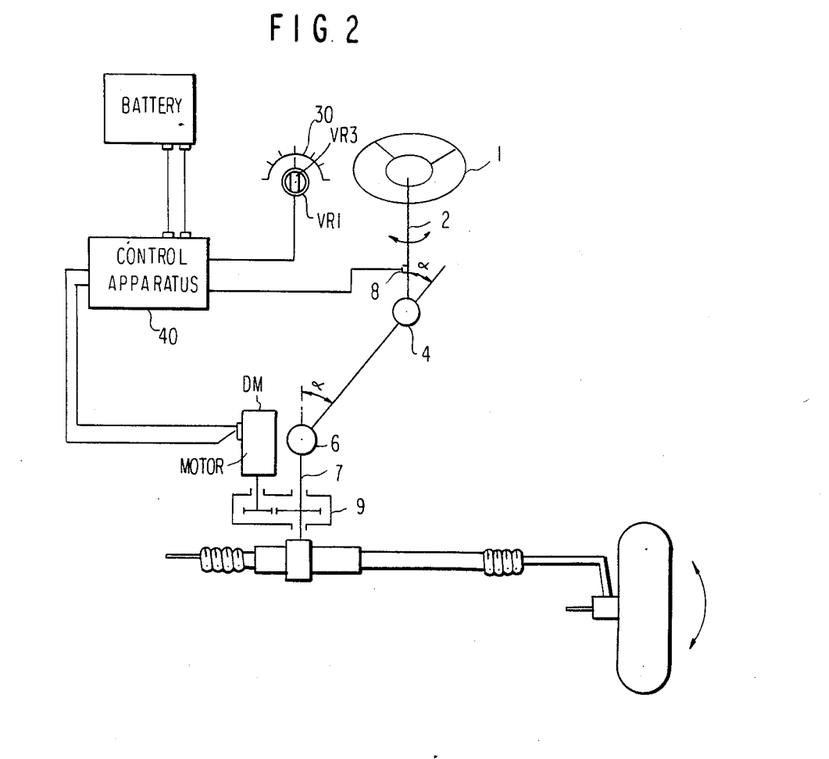
FIG. 2 is a schematic block diagram of the power steering system of the invention.

Referring next to FIG. 2, there is shown the general construction of the power steering system mounted in the vehicle shown in FIG. 1. A first steering shaft 2 is connected to the steering wheel 1, and a second steering shaft 5 is connecred to the first shaft 2 via a first universal joint 4. A third steering shaft 7 is connected to the second shaft 5 via the second universal joint 6. Fixedly secured to the tip of the third shaft 7 is a pinion gear 3a shown in FIG. 3a, with which a steering wheel driving rack 3b shown in FIG. 3b meshes. The inclination angle $\alpha$ of the second shaft 5 with the first shaft 2 Is equal to the inclination angle $\alpha$ of the second shaft 5 with the third shaft 7. The first shaft 2 has torque sensors 8 (only one is shown) firmly mounted thereto. A DC servomotor DM is connected to the third shaft 7 via a reduction gearing 9. The output of each torque sensor 8 is connected to a control apparatus 40, the output of which is connected to the motor DM. The aforementioned variable-resistors VR1 and VR3 to which the knob 30 is secured are connected with the apparatus 40.

Figures 3A, 3B:
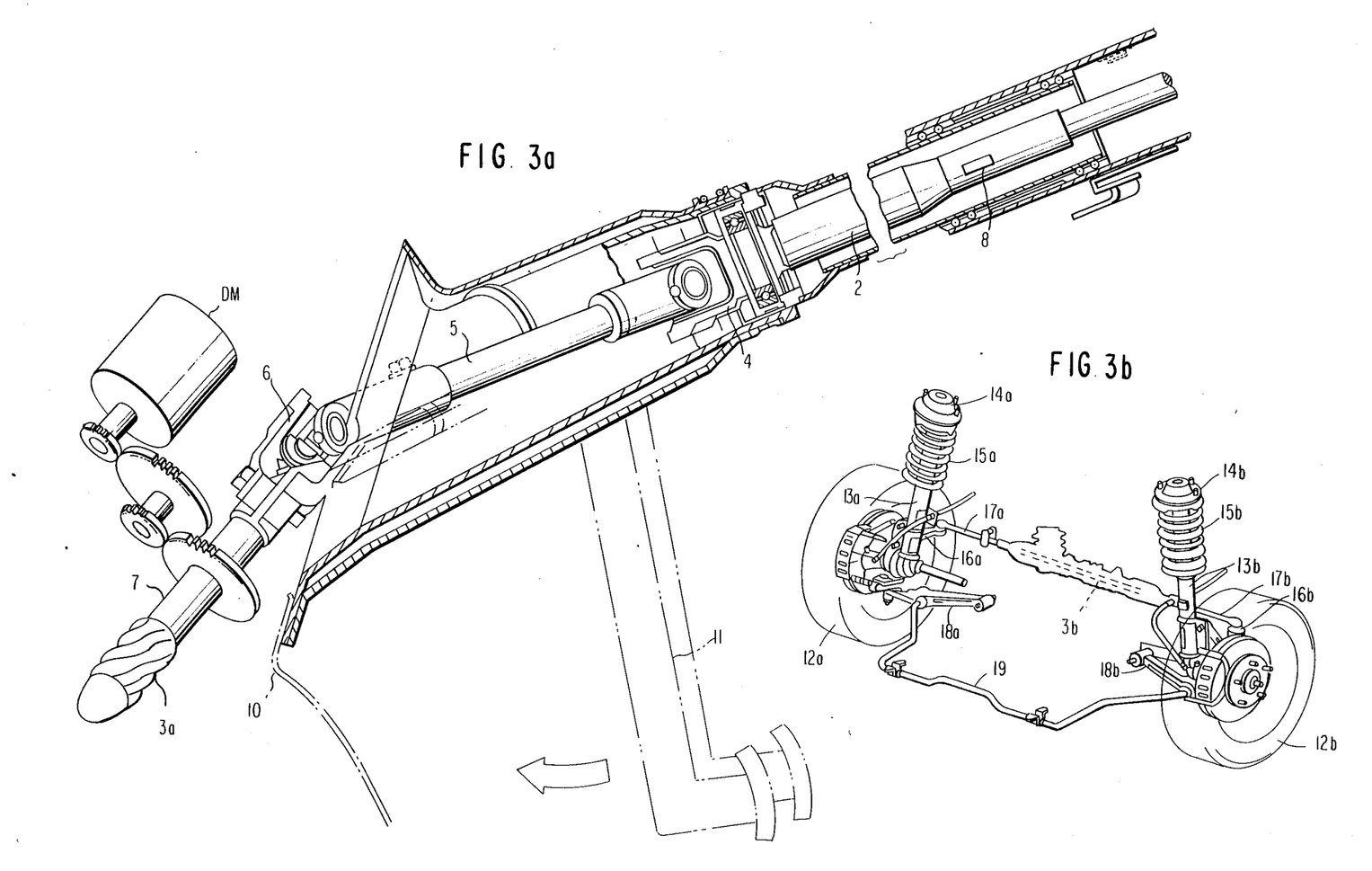
FIG. 3a is a side elevation of the steering mechanism of the system shown in FIG. 2.
FIG. 3b is a perspective view of the steering mechanism shown in FIG. 2.

FIGS. 3a and 3b show the details of the mechanism shown in FIG. 2. FIG. 3a is a cross-sectional view showing the portion close to the driver's feet. In this illustrative example, the reduction gearing 9 is comprised of a combination of four gears and transmits the input force to the second steering shaft 5 while reducing the rotational frequency of the motor DM by a factor of 6. In this specific example, strain gauges are used as the torque sensors 8, it being noted that only one of the gauges is shown in the figure. The other torque sensor is firmly secured to the backside of the first shaft 2. That is, in this example, the force needed to rotate the steering wheel is detected in the form of torsion of the shaft 2. Each of these torque sensors 8 has two sensor elements which respond in different directions. As described later, these four sensor elements are assembled into a bridge circuit, in this example, so that the system may be independent of temperature.

The steering mechanism shown in FIG. 3a extends through two spaces separated by a toe board 10 at the position of the second universal joint 6. The left and right spaces as viewed in this figure are the engine room and the passanger's compartment, respectively. Indicated by referenece numeral 11 is the brake pedal.

Referring next to FIG. 3b, the rotating shafts of the tires 12a and 12b in the front portion of the vehicle are held to suspension upper supports 14a and 14b, respectively, via shock absorbers 13a and 13b, respectively. A coiled spring 15a is mounted between the shock absorber 13a and the support 14a. Similarly, a coiled spring 15b is mounted between the shock absorber 13b and the support 14b. Connected to the bearings for the tires 12a and 12b are steering knuckle arms 16a and 16b, respectively, which are connected to the rack 3b by means of tie rods 17a and 17b, respectively. As already described, the aforementioned pinion 3a meshes with the rack 3b. Also shown are lower suspension arms 18a, 18b, and a stabilizer 19.

Figure 4:
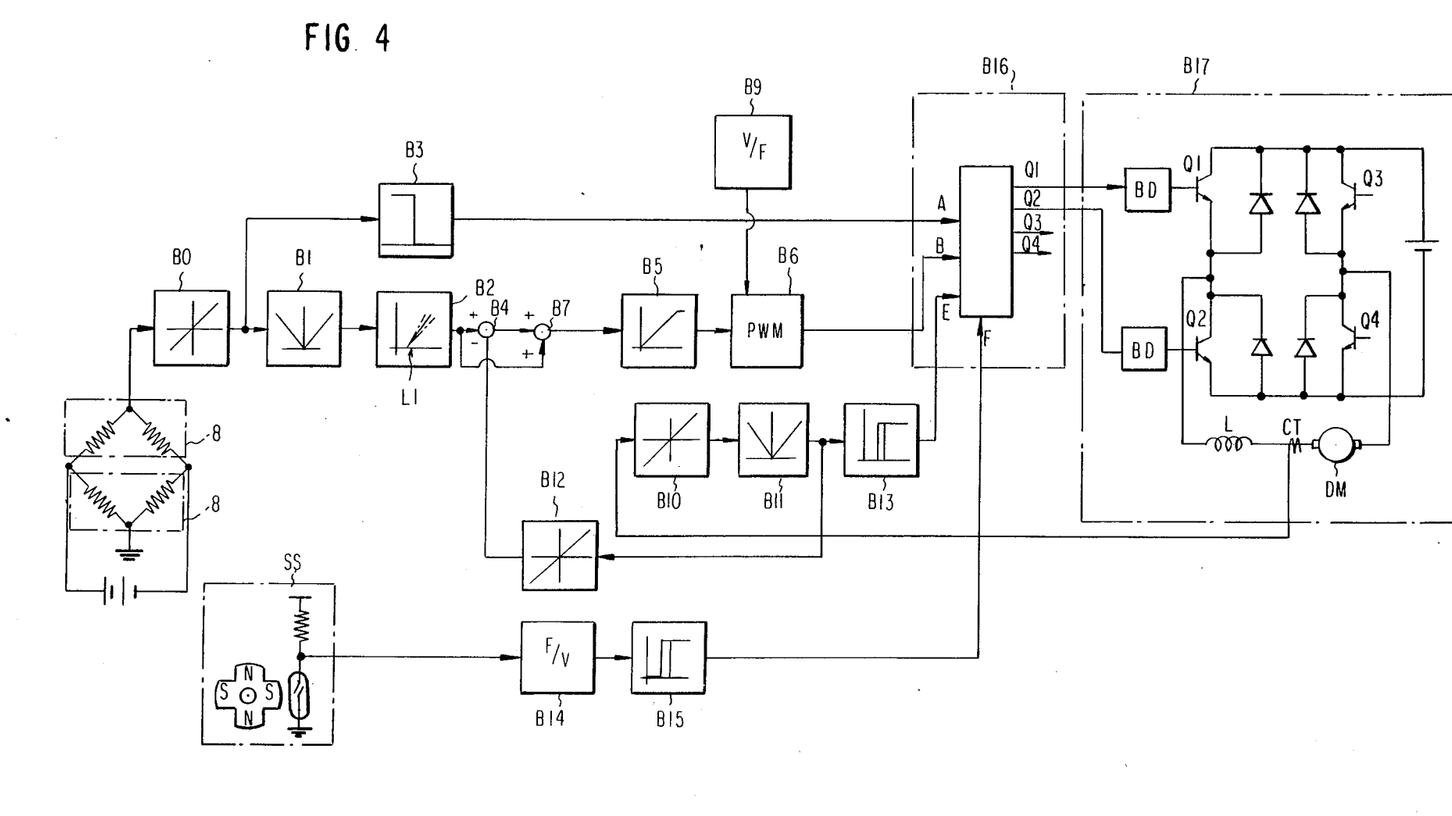
FIG. 4 is a block diagram of the electric circuit ot the power steering system shown in FIG. 2.
Figure 5:
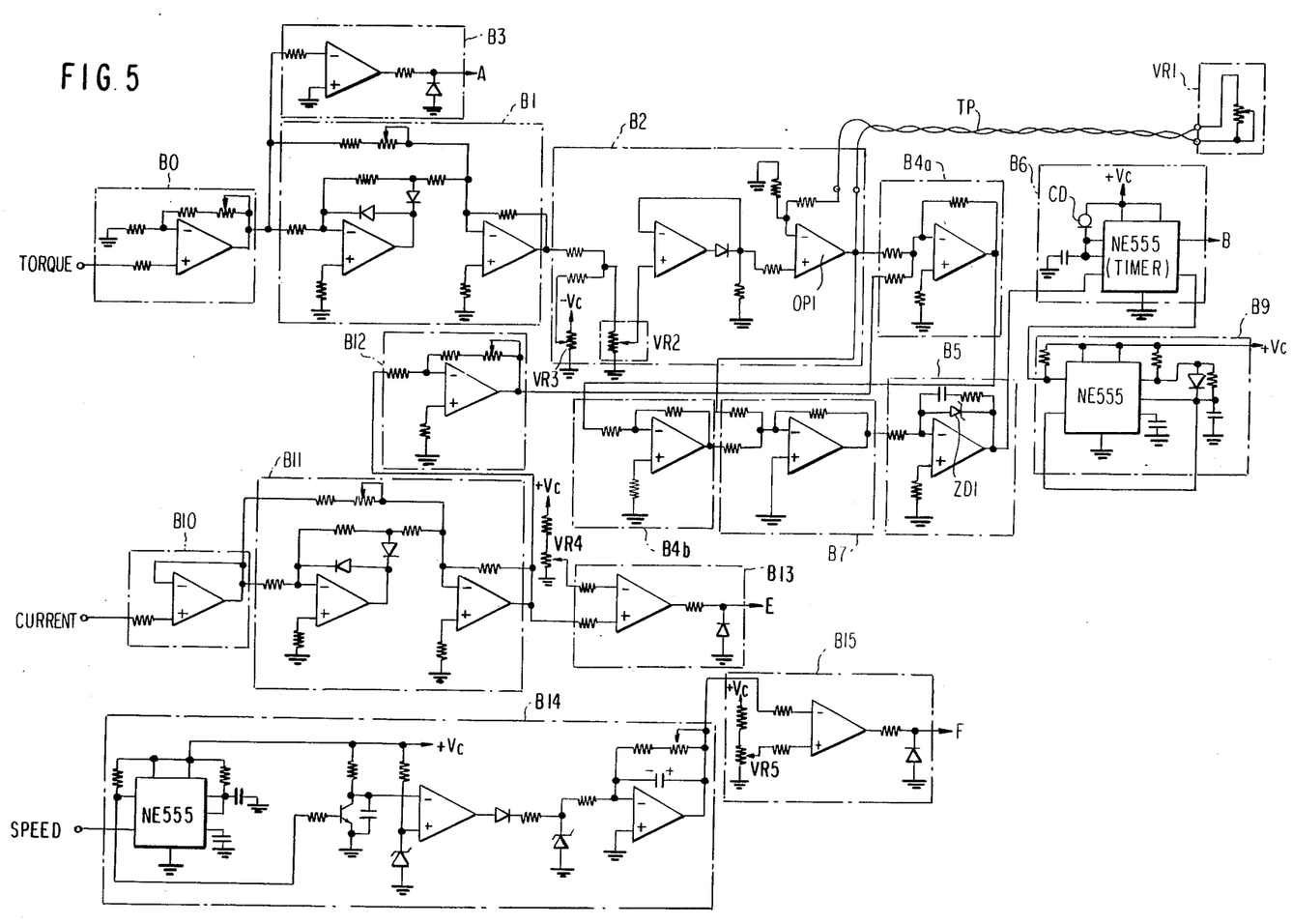
FIG. 5 is a detailed block diagram of a portion of the electric circuit shown in FIG. 4.
Figure 6:
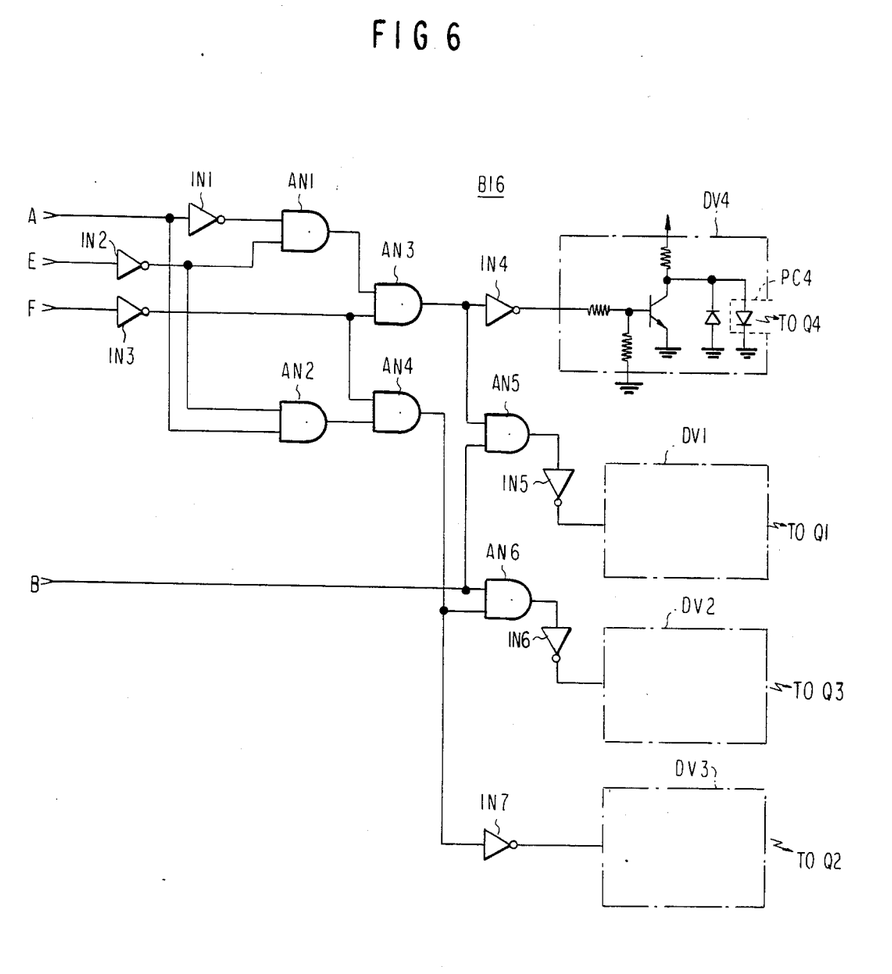
FIG. 6 is a detailed block diagram or another portion of the electric circuit shown in FIG. 4.

The electric circuit of the motor driven power steering system shown in FIG. 2 is now described by referring to FIGS. 4-6. Note that the graphs shown in the blocks in FIG. 4 represent the electric characteristics of the blocks schematically, the abscissa and ordinate of each graph indicating the input level and the output level, respectively. It is also to be observed that each resistor is represented in a small rectangular form in FIG. 5. The two torque sensors 8 constitute the resistance bridge, one output of which is connected to a block BO that is an ordinary linear amplitier. The output of the block BO is coupled to two blocks B1 and B3. The block B1 is an absolute-value circuit producing an output signal which is linearly proportional to its input signal and has positive polarity at all times irrespective of the polarity of the input signal. The block B2 is an amplifier which produces zero output when its input level is less than L1 and an output signal linearly proprotional to its input signal when the input level exceeds L1. The amplification factor of the amplifier B2 is adjustable and set by a variable-resistor VR1 and an attenuator (variable-resistor) VR2 which adjust the quantity of negative feedback provided to an operational amplifier OP1. The level L1 can be adjusted by a variable-resistor VR3. The resistor VR1 and the block B2 are connected together through a twisted pair TP.

The output signal from the block B2 is supplied to an adder B4, which is shown as B4a and B4b in FIG. 5, and to a block B7. The output of the block B7 is connected to a block B5, which is an amplifier producing an output signal linearly proportional to its input signal when the input signal is lower than a predetermined level that is limited by a zener diode ZD1. The amplifier B5 delivers an output signal of a constant amplitude when the input signal is greater than the predetermined level. The block B5 acts as an error amplifier and has the output connected to the modulation input of a block B6 which is a pulse-duration modulation circuit. The circuit B6 having a current regulator diode CD converts the rectangular waveform generated from a blocx B9 into a pulse whose duration is controlled by the control signal from the block B5. In this illustrative example, the rectangular waveform generator circuit B9 produces waveforms of 2 KHz. The output of the block B6 is connected to one input terminal B of a block B16 which is a logical control circuit.

The block B3 connected to the output of the block BO Is a kind of comparator which detects the polarity of its incoming signal. Specifically, the block B3 delivers a logic signal which is changed depending on whether the detected torque is positive or negative and hence on the direction in which the steering wheel 1 is rotated. The output of the block B3 is connected to an input terminal A of the block B16.

A blocx B10 which is a linear amplifier is supplied with a feedback signal according to the current flowing through the DC servomotor DM. The output signal from the block B10 is applied to an absolute-value circuit B11, the output of which is connected to blocks B12 and B13. The block B12 is a linear amplifier and produces an output signal of positive or negative polarity to a block B4. The block B 13 is a comparator which detects overload (abnormal current) on the servomotor DM. The reference level of the comparator B13 is adjusted by a variable-resistor VR4. The circuit also includes a sensor SS for detecting the velocity of the vehicle. In this example, the sensor is made up of a magnet and a reed switch. The magnet is connected to the speedometer cable and is rotated according to rotation of the axle of the vehicle. The reed switch is caused to close and open in response to changes in magnetic field induced by the rotation of the magnet and produces a pulse signal corresponding to the velocity of the vehicle. This signal is applied to a frequency-to-voltage converter B14, abbreviated F/V converter, the output signal of which is furnished to an input terminal F of the block B16 via a comparator B15 that is equipped with a variable-resistor VR5 to change the reference level of the comparator. In this example, the comparator can be set to any desired vehicle velocity in the range from 20 to 50 Km/h by adjusting the variable-resistor VR5.

Switching transistors for power control purposes are connected to their respective output terminals of the logical control circuit B16 via their respective base drivers BD. Transistors Q1, Q2, Q3 and Q4 serve to drive the DC servomotor DM and are connected in the form of a bridge to change the polarity. More specifically, by energizing two diametrically opposite transistors, a current of a given polarity flows into the motor DM. A current transformer CT detects the load current. A DC reactor L prevents the motor current from becoming interrupted due to pulse duration modulation.

Referring next to FIG. 6, the logical control circuit B16 consists of AND gates AN1-AN6, inverters IN-1-IN7, and drivers DV1-DV4. The crivers DV1-DV4 have the same construction, and each of them consists of a photocoupler where a light-emitting diode is optically coupled to a photodiode. The light-emitting diode is driven by a transistor, or the like. The light-emitting diodes and the associated photodiodes of the drivers DV1-DV4 are included in the respective base drivers BD for driving the bases of the transistors Q1-Q4.

Figure 7:
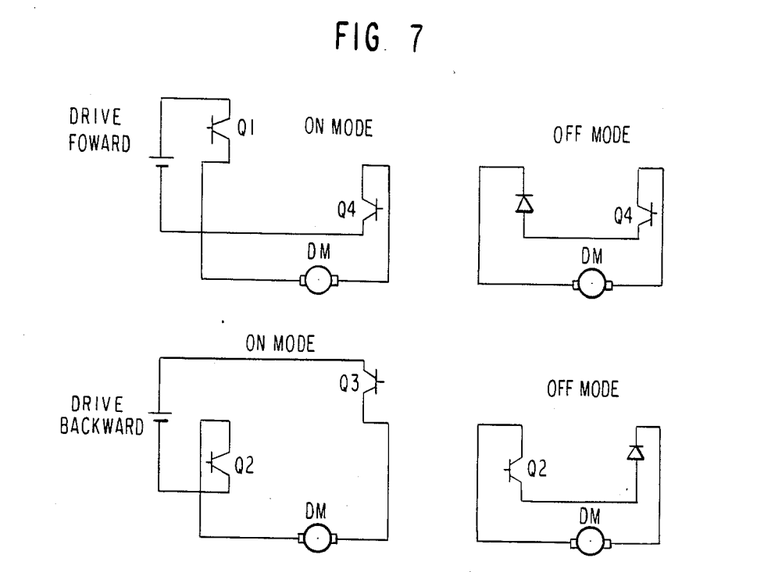
FIG. 7 shows wiring diagrams of the eiectrical connections with electric motor DM in various operation modes.
Figure 8:
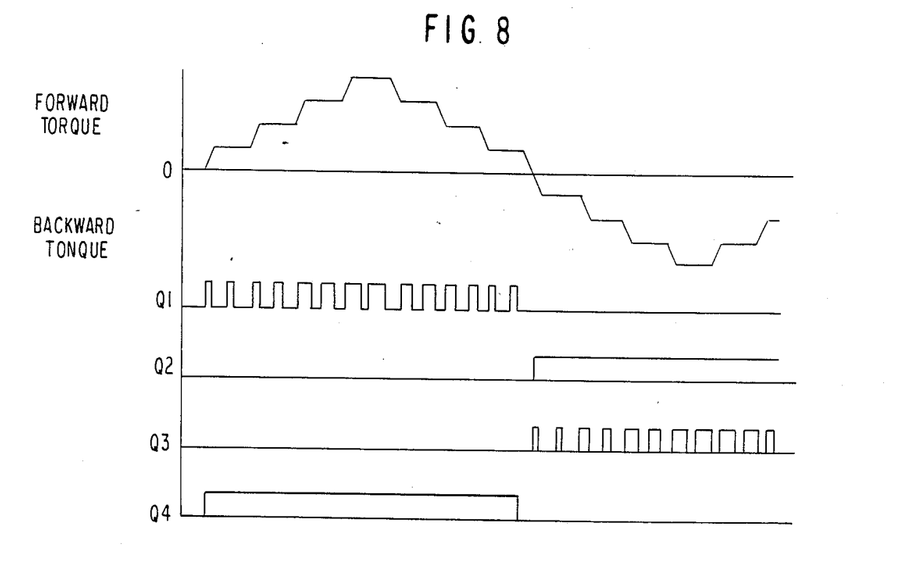
FIG. 8 is a timing chart for illustrating one example of operation timing.
Figure 9:
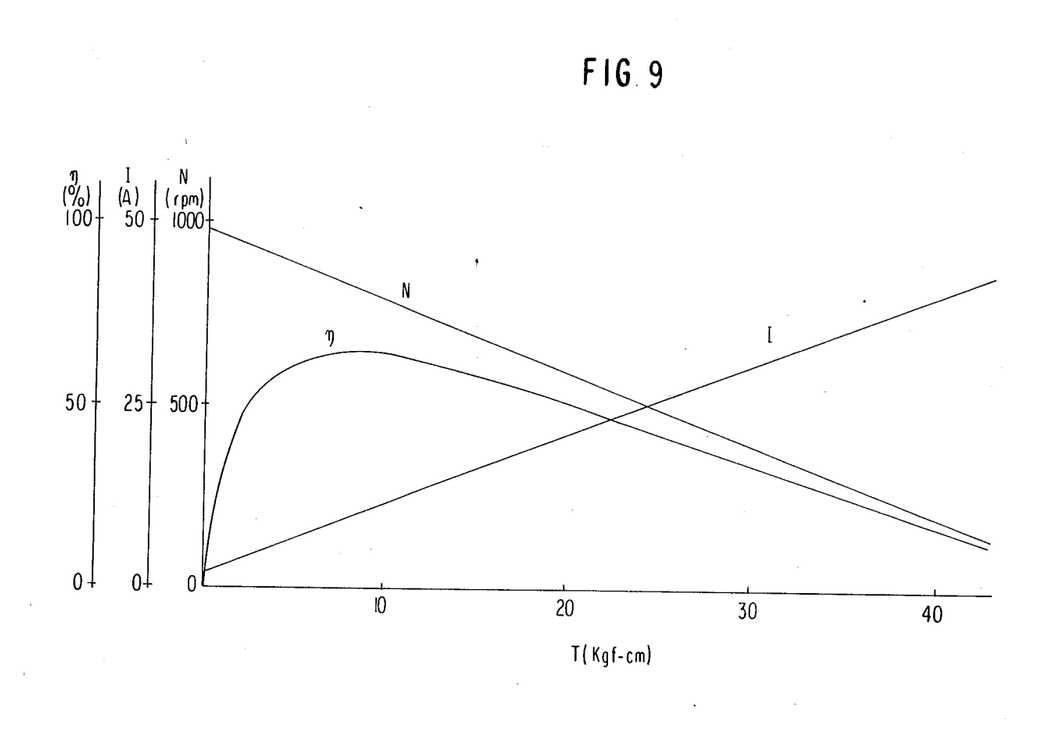
FIG. 9 is a graph showing the characteristics of the motor DM.
Figure 10:
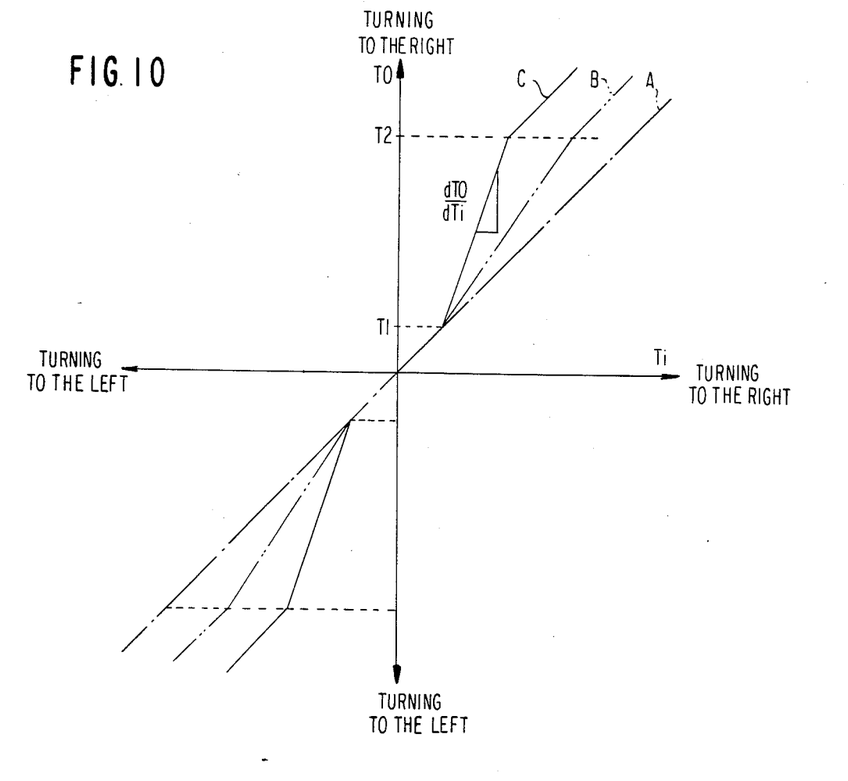
FIG. 10 is a graph showing the relation between the input torque $T_i$ and the output torque $T_o$ of the power steering system shown in FIG. 2.

Before describing the operation of the novel system described hereinbefore, the remaining figures are briefly described. FIG. 7 shows the manner in which the servomotor DM s connected to a conducting transistor in each operation mode. FIG. 8 illustrates one example of operation timing. FIG. 9 shows the relation between the torque of the motor used in the above example and current I, the relation between the torque and rotational frequency N, and the relation between the torque and efficiency η. FIG. 10 shows the relation between the input torque Ti generated when the driver of this vehicle operates the steering wheel and the output torque $T_o$ applied to the steering mechanism, the torque $T_o$ including the auxiliary torque produced by the motor DM.

When the velocity of the vehicle is lower than the velocity $V_m$ set by the variable-resistor VR5, a low level signal $L_s$ is applied to the input terminal F of the logical control circuit B16. Under this condition, if the driver rotates the steering wheel with a torque greater than a predetermined value, the signal level applied to the terminal A of the circuit B16 is determined according to the direction of the rotation. Then, the pulse duration modulation circuit B6 supplies a pulse of a predetermined duration to the input terminal B of the circuit B16. Accordingly, the output level of either the AND gates AN1 and AN3 or the AND gates AN2 and AN4 assumes logic 1 state, depending on the direction of the rotation of the steering wheel, thus energizing the photocoupler of the driver DV4 or DV3. At the same time, the pulse from the modulation circuit B6 is applied to the driver DV1 or DV2 either via the AND gate AN5 and the inverter IN5 or via the gate AN6 and the inverter IN6. If the pulse is applied to DV1, for example, the transistor is driven on or off according to the pulse, whereby energizing or deenergizing the photocoupler. The drivers which receive no pulse are kept in ON condition at all times and hence deenergize their respective photocouplers. When the photocoupler of the driver DV1 is energized, the transistors Q1 and Q4 are driven on, and then a current flows as indicated by the ON and OFF modes in the forward rotation condition in FIG. 7. However, when the photocoupler is deenergized, the transistor Q1 is switched off, thereby shutting off the current path. The current flowing into the motor is always controlled by the pulse in a switching manner, and therefore the electric power fed to the motor and the motor torque are varied according to the pulse duration. When a pulse is applied to the driver DV2, the transistor Q3 is driven on and off according to the pulse, and the electrical connection is changed as indicated by the ON and OFF modes in the reverse rotation condition in FIG. 7. The motor current is detected by the current transformer CT, and the resultant signal is fed back to the pulse duration modulation circuit B6. Thus, the servomotor DM is driven by a current corresponding to the torque which is produced when the driver of the vehicle rotates the steering wheel.

The relation between the steering torque Ti applied by the driver of the vehicle and the output steering torque $T_o$ varies as shown in FIG. 10. In particular, when the detected torque lies in the range from 0 to T1 in absolute values which is determined by the setting of the variable-resistor VR3, the output level of a function generator B2 is in zero state and so no current flows into the motor DM. Consequently, in this range, or dead zone, the torque Ti applied by the driver is equal to the output steering torque $T_o$. Wnen the torque reaches Tl, the output level of the function generator B2 varies according to the torque. Then, the motor produces an auxiliary torque which is added to the torque applied by the driver, thus increasing the output steering torque. When the detected torque reaches the maximum torque T2 in absolute value that the motor can deliver, the output level of the block B5 is clamped at a constant value. The motor torque is also maintained at that value. Therefore, even if the detected torque increases further, the motor torque no longer increases.

When the detected torque lies in the range from Ti to $T_o$, the relation between the input torque Ti and the output torque $T_o$, i.e. servo ratio $dT_o/dT_i$ is determined by the amplification factor of the function generator B2. That is, if the value set by the variable-resistor VR1 or VR2 is changed, the output signal level from the generator B2 is also varied for the same detected torque. As a result, the torque produced by the motor is also changed. The characteristic obtained when the motor torque, or the auxiliary torque, is zero is indicated by A (servo ratio is 1) in FIG. 10. When the power steering system operates according to the value set by the resistor VR1, the characteristic has an inclination (servomotor) corresponding to the set value as indicated by B and C in FIG. 10

Figure 11:
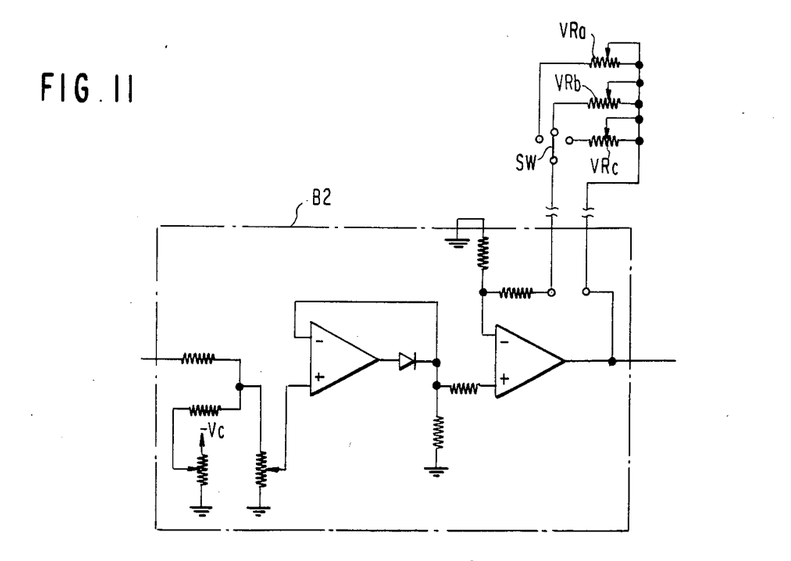
FIG. 11 is a block diagram of a portion of the electric circuit used in another power steering system of the invention.

Although the above embodiment uses the variable-resistors VR1 and VR3 to change the servo ratio of the power steering system, switch, semiconductor variable-resistor elements, or combination thereof may be employed instead. For example, a servo ratio setting means may be made up of a plurality of variable-resistors VRa, VRb, VRc, and a selector switch SW, as shown in FIG. 11. According to this configuration, it is easy to alter the servo ratio by operating the switch SW, if the resistors have been previously set at appropriate values. In case where a plurality of persons use the same vehicle, for example, the variable-resistors may be assigned to the users individually. Thus, it is not necessary to readjust the servo ratio each time the driver is replaced by another person. Also, it is possible to replace the variable-resistors VRa, VRb and VRc with semi-fixed resistors which are set for the characterstics at velocities close to zero, the characteristics for female drivers, and the characteristics for male drivers, respectively. According to this configuration, the setting of the servo ratio can be performed simply by operating the switch.

In addition, although the system in the above embodiment consists of the logical control circuit and the analog circuitry making use of ordinary logical elements, the logical control circuit may be replaced oy a microcomputer. Further, a high-speed computer may be used in the analog circuitry. In case where a microcomputer is used, the setting of the servo ratio may be effected by reading the key operations done by the driver. Alternatively, the system may be equipped with a commercially available speech recognition apparatus to set the servo ratio in response to the driver's voice. It is also to be noted that in the above embodiment the power steering operation is caused to start and cease according to the velocity of the vehicle. This switching operation is not essential to the present invention, because the invention permits change in the servo ratio.

As described hereinbefore, the present invention permits change in the servo ratio of the power steering system. Hence, each individual driver can obtain a steering feeling according to his or her own liking.

What is claimed is:

1. A motor driven power steering system comprising:
   a steering shaft;
   an electric motor;
   coupling means for coupling said steering shaft to said electric motor;
   torque detecting means for detecting the steering torque applied to said steering shaft by a driver and producing a steering torque signal for responding to the steering torque applied by the driver;
   control means connected to said torque detecting means for controlling the energization of said motor according to said steering torque signal from said torque detecting means; and
   servo ratio setting means separate from said steering shaft and torque detecting means operable by said driver and connected to said control means for establishing the degree of power assistance provided by the energization of said motor.

2. A motor driven power steering system as set forth in claim 1 wherein said control means includes a closed loop control system for feeding a signal corresponding to the output of said motor back to the input side of said loop and wherein said servo ratio setting means sets the amplification factor of an amplifier connected between the input terminal of the loop to which the torque signal is applied and the output of the torque detecting means.

3. A motor driven power steering system as set forth in claim 2 wherein said servo setting means is composed of a variable resistor.

4. A motor driven power steering system as set forth in claim 2 wherein said servo setting means is comprised of a plurality of variable resistors and selector switch means for connecting a selected variable resistor to said control means.

5. A motor driven power steering system as set forth in claim 2 further comprising circuit means connected between said amplifier and said motor for delivering an output signal of constant amplitude when the input signal thereto is greater than a predetermined level.

6. A motor driven power steering system as set forth in claim 2 wherein said servo ratio setting means includes a first setting means for determining the range in which no current flows to said motor and a second setting means for determining the relation between the input torque and the output torque.

7. A motor driven power steering system as set forth in claim 1 further comprising vehicle speed detecting means, setting means for setting a predetermined vehicle speed and control means for stopping the energization of said motor when the actual vehicle speed is above a predetermined speed.

* * * * *

UNITED STATES PATENT AND TRADEMARK OFFICE
CERTIFICATE OF CORRECTION

PATENT NO. : 4,574,903

DATED : March 11, 1986

INVENTOR(S) : Hashimoto et al

It is certified that error appears in the above-identified patent and that said Letters Patent is hereby corrected as shown below:

ON THE FIRST PAGE:

Please change Assignee's city address from "Kawasaki City" to --Kariya City--.

Signed and Sealed this

Twenty-sixth Day of August 1986

[SEAL]

Attest:

DONALD J. QUIGG

Attesting Officer

Commissioner of Patents and Trademarks